US007206466B2

(12) United States Patent
He et al.

(10) Patent No.: US 7,206,466 B2
(45) Date of Patent: Apr. 17, 2007

(54) POLARIZATION DEPENDENT LOSS LOOP

(75) Inventors: Jian He, San Jose, CA (US); Ping Xie, Cupertino, CA (US); Chester Chien, San Jose, CA (US)

(73) Assignee: Finisar Corporation, Sunnyvale, CA (US)

( * ) Notice: Subject to any disclaimer, the term of this patent is extended or adjusted under 35 U.S.C. 154(b) by 200 days.

(21) Appl. No.: 10/693,774

(22) Filed: Oct. 24, 2003

(65) Prior Publication Data
US 2005/0002099 A1 Jan. 6, 2005

Related U.S. Application Data

(60) Provisional application No. 60/422,212, filed on Oct. 30, 2002, provisional application No. 60/422,210, filed on Oct. 30, 2002.

(51) Int. Cl.
*G02B 6/00* (2006.01)
(52) U.S. Cl. .................... 385/11; 359/494; 359/497; 398/152; 398/184
(58) Field of Classification Search .............. 359/483, 359/485, 494, 497; 398/152, 184, 205; 385/11, 385/24
See application file for complete search history.

(56) References Cited

U.S. PATENT DOCUMENTS

| 5,473,457 | A  | * | 12/1995 | Ono ........................... 398/185 |
| 6,385,356 | B1 | * | 5/2002 | Jopson et al. .................. 385/11 |
| 6,493,474 | B1 | * | 12/2002 | Yao ............................. 385/11 |
| 2003/0048973 | A1 | * | 3/2003 | Asami .......................... 385/11 |
| 2003/0174400 | A1 | * | 9/2003 | Patel et al. ................... 359/498 |

\* cited by examiner

*Primary Examiner*—Sung Pak
*Assistant Examiner*—Daniel Petkovsek
(74) *Attorney, Agent, or Firm*—Workman Nydegger

(57) ABSTRACT

A system and method for reducing polarization dependent loss in optical circuits is disclosed. The system includes a first optical device having an output, and a polarization controller optically coupled to the first optical device for adjusting a polarization state of the output of the first optical device. The system further includes a second optical device optically coupled to the polarization controller. Adjusting the polarization state of the output of the first optical device alters a total polarization-dependent loss for the cascaded device system. A series of fiber optic loops can be used to adjust the output of the first optical device. A PDL measuring device can be inserted after the second optical device to provide feedback to the polarization controller, so that the controller may be tuned to adjust the polarization to a desired state.

8 Claims, 2 Drawing Sheets

POLARIZATION DEPENDENT LOSS LOOP

CROSS-REFERENCE TO RELATED APPLICATIONS

This application claims priority to and the benefit of U.S. Provisional Patent Application Nos. 60/422,212, filed on Oct. 30, 2002 and entitled "Polarization Maintaining Coupler", and 60/422,210, filed on Oct. 30, 2002 and entitled "Polarization Dependent Loss Loop", both of which are incorporated herein by reference in their entireties.

BACKGROUND OF THE INVENTION

1. The Field of the Invention

The present invention relates generally to systems and methods for decreasing the overall polarization dependent loss in a series of cascaded optical components.

2. The Relevant Technology

Polarization can be defined as the property of an electromagnetic wave that describes the orientation, i.e., time-varying direction and amplitude, of the electric field vector of the wave. States of polarization are described in terms of the figures traced as a function of time by the projection of the extremity of a representation of the electric vector onto a fixed plane in space, which plane is perpendicular to the direction of propagation. In general, the figure, i.e., polarization, is elliptical and is traced in a clockwise or counterclockwise sense, as viewed against the direction of propagation. If the major and minor axes of the ellipse are equal, the polarization is said to be circular. If the minor axis of the ellipse is zero, the polarization is said to be linear. Rotation of the electric vector in a clockwise sense is designated right-hand polarization, and rotation in a counterclockwise sense is designated left-hand polarization.

The polarization of an optical signal plays an important role in the propagation of optical signals in an optical data network. For instance, the amount of an optical signal, such as light, reflected at the boundary between two different materials, depends on the polarization of the incident wave. The amount of an optical signal absorbed by certain materials is polarization dependent. The refractive indices of anisotropic materials are polarization dependent. Some optically active materials have the ability to rotate the polarization of an input beam of light. In all of the above cases, polarization dependent losses can occur.

A definition of polarization-dependent loss (PDL) is the maximum change in insertion loss due to changes in the polarization state of a signal. It may be quantitatively expressed as:

$$PDL_{db} = 10\log_{10}\left(\frac{I_{max}}{I_{min}}\right) \quad (1)$$

where I is defined as the intensity of light. The value for I is equal to $E^2$, where E is a value of the electrical field vector of an optical component for various polarization states. $I_{max}$ is then equal to $E_{max}^2$, and $I_{min}$ is equal to $E_{min}^2$. PDL is expressed in decibels.

Polarization-dependent loss is a measurable characteristic that can be used to evaluate the insensitivity of an optical component to changes in the polarization state of a light signal passing through the component. A feature of a component in an optical fiber communications network is the component's insensitivity of response to changes in the polarization state of an input light signal.

For any given component in a system, the polarization direction of the output light can be arbitrary, depending on the polarization of the light input into the component. It is entirely possible for light input at one arbitrary polarization direction to result in a minimum insertion loss, while light input at another arbitrary polarization direction results in a maximum insertion loss for a particular component. The difference between the maximum and minimum insertion loss is defined as PDL. A large PDL often results in an increased bit error rate of the optical communication system, which is a serious system impairment.

As components are added (cascaded) in a system, the PDL is cumulative. Since the output polarization direction for a given component in a chain can be arbitrary, the PDL can either cancel itself out, or accumulate additively. A large PDL can adversely affect the optical transmission properties for a given set of components. Thus, PDL is an important characteristic for optical components used in, for example, telecommunications networks. Reducing PDL can be a priority in optical systems.

BRIEF SUMMARY OF THE INVENTION

In order to reduce PDL, a device, such as a polarization controller, can be introduced into the component stream to change the polarization of the light signal to a desired direction as the light signal enters into one part of the optical module or system from another part of the optical module or system through a polarization controller. As long as the direction is selected to introduce PDL cancellation in the following component, the PDL of the system can be reduced or even almost eliminated. Unfortunately, current polarization controllers are either highly complex, expensive, or both. They are designed primarily for laboratory testing purposes. Additionally, the polarization direction of these devices will usually change as the devices age.

The present invention provides a system and method for reducing polarization dependent loss in optical circuits. The system for adjusting a polarization dependent loss includes a first optical device having an output, and a polarization controller optically coupled to the first optical device for adjusting a polarization state of the output of the first optical device. The system further includes a second optical device optically coupled to the polarization controller. Adjusting the polarization state of the output of the first optical device alters a total polarization-dependent loss for the cascaded device system. A PDL measuring device can be inserted after the second optical device to provide feedback to the polarization controller, so that the controller can be tuned to adjust the polarization output of the first device to a desired state, to minimize the PDL of the cascaded system.

In an alternate exemplary embodiment of the present invention, the polarization controller is replaced by a series of hinged petals, each containing loops of fiber optic cable for adjusting the polarization state of an input optical signal. By selecting the radius, number and orientation of the loops, the polarization can be adjusted to any arbitrary direction. A PDL measuring device can also be used in the embodiment so that the petals can be tuned to adjust the polarization to a desired state.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof that are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE EXEMPLARY EMBODIMENTS

The present invention relates to a system and method to reduce polarization dependent losses (PDL) in cascaded optical devices. The total PDL of the cascaded devices can be reduced by manipulating the polarization states between the devices. Reduction of the total PDL for the cascaded devices can allow for relaxation of the PDL for each device in the cascade, thus reducing the cost of the cascaded system.

For cascaded optical devices, the PDL of the devices taken as a whole could be between the sum of the PDL for each individual device and the difference of the PDL for each individual device. Unfortunately, since the polarization within some optical devices can be arbitrary, predicting in advance the polarization loss can be problematic. As an example, suppose that two optical devices are cascaded. An implementation of the disclosure for reducing the PDL of the cascaded devices includes making the output polarization state for the first device the maximum insertion loss state, such that this polarization state can generate a minimum insertion loss for the second device. Alternately, one could make the output polarization state for the first device the minimum insertion loss state, such that this polarization state can generate a maximum insertion loss for the second device. The PDL of the cascaded devices can approach the difference of the individual device PDLs:

$$PDL_{cas} = |PDL_1 - PDL_2| \quad (2)$$

Where $PDL_{cas}$ is the polarization-dependent loss of both devices cascaded and $PDL_1$ and $PDL_2$ are the polarization-dependent losses for the first device and the second device, respectively. The cascaded PDL can be substantially reduced.

Figure 1:
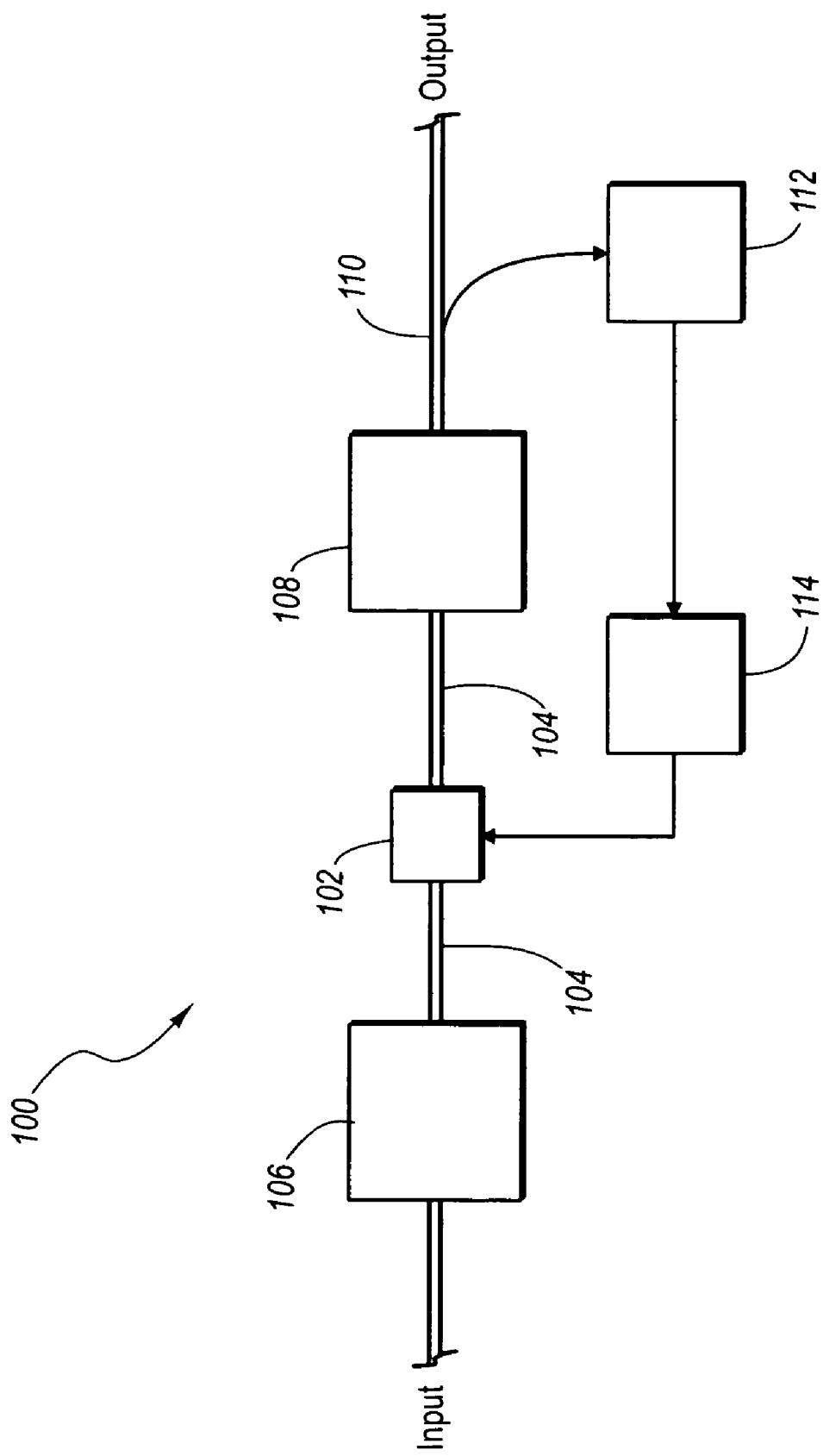
FIG. 1 is a schematic view of an exemplary implementation of a polarization-dependent loss loop circuit according to one aspect of the present invention.

FIG. 1 illustrates a schematic view of an exemplary implementation of a polarization-dependent loss loop circuit 100 according to one aspect of the present invention. A commercial polarization controller 102 can be inserted in an optical fiber link 104 between a first cascaded optical device 106 and a second cascaded optical device 108 to control the polarization of an optical signal, such as a light beam, through fiber 104. A PDL output 110 from second device 108 can be monitored using PDL measuring equipment 112 that is commercially available. The results of measuring equipment 112 may be used to adjust polarization controller 102 to reduce the PDL of the cascaded devices.

Cascaded optical devices 106, 108 can be any of a number of different optical elements. Devices 106 and 108 can be a laser transmitter, a polarization beam splitter, an optical crystal, a waveguide, a circulator, an interleaver, or any other optical devices that can be found in a fiber optic network and which have the potential for some polarization loss as signals pass therethrough.

Some polarization controllers can transform an arbitrary input state of polarization into a desired output polarization state. The controller 102 can operate on an input fiber optic light signal to supply a linearly polarized output light signal with any desired polarization direction. The adjustment of polarization controller 102 may be manual or automatic and may include additional circuitry 114 to modify the output of measuring equipment 112 as necessary to adjust polarization controller 102.

An example of such additional circuitry can include an automatic search circuit. In such a case, polarization controller 102 could scan through all polarization states and eventually park at a state which results in the lowest PDL at the output of the system. Such polarization controllers 102 are widely available. For example, an Agilent model 11896A polarization controller, a Thorlab model FPC560 polarization controller, or other available controllers can be used.

Figure 2:
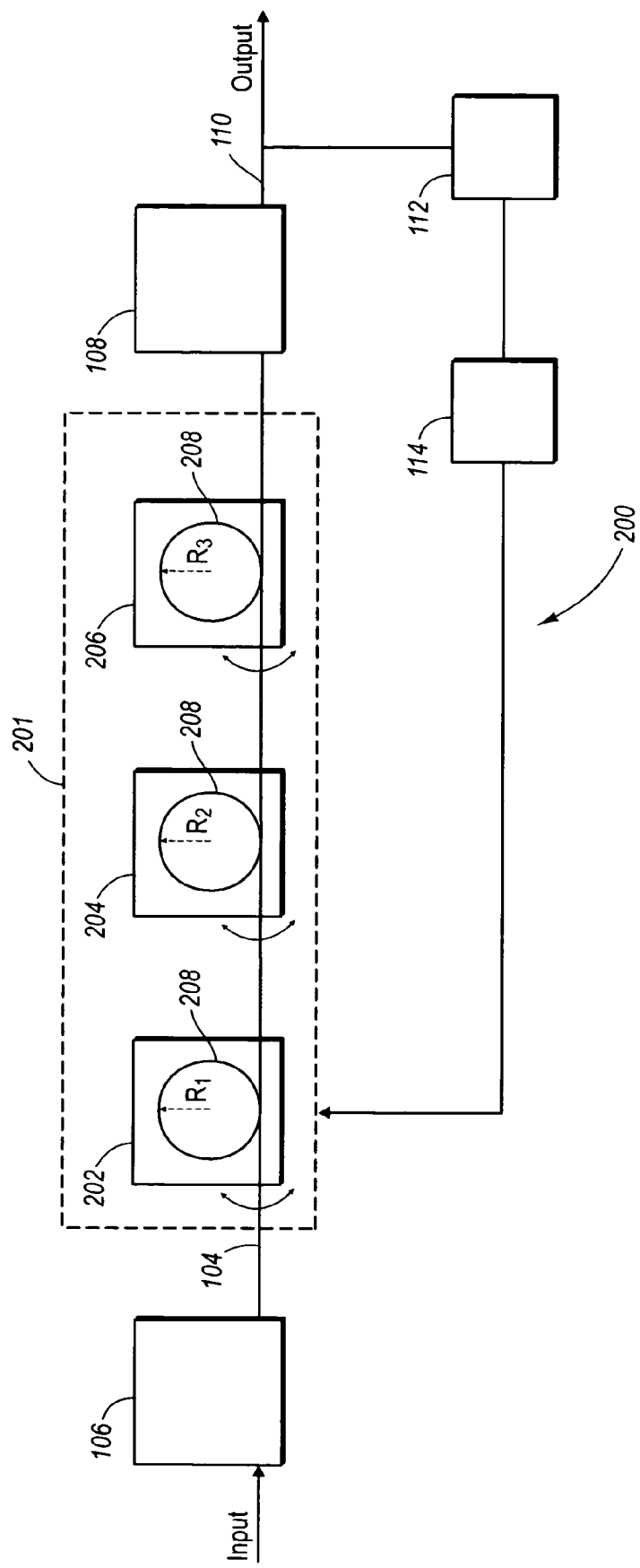
FIG. 2 is a schematic view of an alternate exemplary implementation of a polarization-dependent loss loop circuit according to an alternate aspect of the present invention.

FIG. 2 illustrates a schematic view of an alternative exemplary implementation of a polarization-dependent loss loop circuit 200 according to another aspect of the present invention. A polarization controller 201 made up of a series of hinged petals 202, 204, and 206 is inserted between first cascaded device 106 and second cascaded device 108 along fiber 104.

Each petal 202, 204, and 206 contains a fixed number of fiber optic cable loops, having radius $R_1$, $R_2$ and $R_3$ respectively. The fiber optic cable loops can be used to adjust the polarization state of the optical signal exiting first cascade device 106. The petals 202, 204, and 208 are hinged, which means that they are free to rotate independently about fiber 104. The polarization state of a beam exiting petals 202, 204 and 206 can be varied by adjusting the number of fiber optic cable loops, the radius R1–R3 of the loops, and the rotational angle of hinged petals 202, 204 and 206.

Radius R1–R3 of the fiber in petals 202, 204 and 206 can be selected based on the type of fiber being used and the desired birefringence requirement in the fiber loop. If the value of R1–R3 is too small, light will leak into the surrounding cladding. If it is too large, there will be insufficient stress on the fibers to adjust the polarization state of the light. For high Numerical Aperture (NA) fiber, a smaller loop can be used which usually has high birefringence, i.e. more polarization rotation. For low NA fiber, a big loop has to be used to avoid bending loss. A bigger fiber loop has a lower birefringence. To make up for this reduced birefringence, many more loops can be required.

For a fiber loop, the bending of the fiber causes birefringence inside the fiber. This birefringence then causes a light wave phase delay (retardation) between two orthogonal states of polarization. This phase delay $\Phi$ can be expressed as the function of wavelength $\lambda$ and bending radius R:

$$\Phi = \frac{K}{\lambda R}, \quad (3)$$

where K is a coefficient that depends on the structure of the optical fiber used. For conventional 125 μm single mode fiber, K=18 rad·mm·μm. For example, for a 25 mm radius fiber loop and a 1.55 μm wavelength light wave, one fiber loop generates about 0.46 radians of phase delay. Multiple loops can be used to generate larger phase delays.

The polarization-dependent loss reduction using the exemplary embodiment of FIG. 2 can be demonstrated by experimentation. The polarization states corresponding to a maximum and minimum insertion loss for cascaded optical devices 106 and 108 can be tested and recorded using a polarization analyzer such as the Agilent 8509C. A series of predetermined fiber loops that have a previously determined effect on the polarization state of the light in optical fiber 104 can be inserted between first and second optical devices 106 and 108 in accordance with the output polarization state of first optical device 106 and the corresponding input polarization of second optical device 108. However, in many cases, a direct calculation is often difficult and impractical, most often the PDL minimization is realized by trial and error until a minimum is reached.

For example, with reference to FIG. 2, the three fiber loops can be configured as a linear polarizer, a quarter-wave plate and a half-wave plate. According to the output polarization state of the first device and the input polarization state of a second device, the characteristics of these fiber loops can be determined by using the Poincare sphere method or using mathematical manipulation of the polarization expressions. Then, the construction of these fiber loops can be made by using equation (3). The polarization states of first and second optical devices 106, 108 can be maximum, minimum, or intermediate insertion loss states as long as the PDLs of the individual devices combine to reduce the total PDL of the cascaded devices.

When there is a lack of sufficient equipment, such as an Agilent 8509C polarization analyzer to record the output polarization state of first optical device 106 and the corresponding input polarization of second optical device 108, an alternative method for the polarization-dependent loss reduction can be used. One such alternate method is to use trial and error. In this method, when optical devices 106 and 108 are cascaded, the fiber loops are inserted between these devices. By changing the loop counts, loop number and loop orientations, and monitoring the final PDL of the cascaded devices, one can easily achieve PDL reduction. One skilled in the art will quickly realize that specific solutions to the number and orientation of the loops can be obtained in this manner.

In a first example, optical devices 106 and 108 are both optical circulators each having a PDL of 0.8 dB. The measured values of PDL of the cascaded devices are shown in Table I for various wavelengths (λ) and temperatures. A commercial three fiber loop polarization controller is used. By using the trial and error method, and monitoring the final PDL of the cascaded devices, significant PDL reduction is achieved.

TABLE I

| Wavelength, λ (nm) | Temperature | | |
|---|---|---|---|
| | −5° C. | 23° C. | 70° C. |
| 1525 | 0.020 | 0.020 | 0.022 |
| 1550 | 0.022 | 0.025 | 0.023 |
| 1575 | 0.029 | 0.028 | 0.029 |

In another example, optical devices 106 and 108 are both interleavers having a PDL of 0.12 dB and 0.14 dB, respectively. The measured values of PDL of the cascaded devices are shown in Table II for various wavelengths (λ) and temperatures. Two fiber petals with diameters of 50 mm and three loops of fiber in each petal are used. In this example, both of these petals were laid on the horizontal plane.

TABLE II

| Wavelength, λ (nm) | Temperature | | |
|---|---|---|---|
| | −5° C. | 23° C. | 70° C. |
| 1530.334 | 0.071 | 0.068 | 0.078 |
| 1550.116 | 0.091 | 0.080 | 0.090 |
| 1560.067 | 0.170 | 0.160 | 0.160 |

As can be seen from the above tables, the method of the invention significantly reduces the potential PDL for the cascaded devices. This is true regardless of the polarization of the light input into device 106.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system for adjusting a polarization dependent loss, the system comprising:
   a first optical device having an optical output;
   a second optical device optically coupled to said first optical device; and
   a polarization controller optically coupled to both said first optical device and said second optical device, said polarization controller comprising at least one petal that contains at least one fiber optic cable loop, said petal being rotatable about an axis that is parallel to a direction of travel of a light signal passing through said first and said second optical device, said polarization controller adjusting a polarization state of said optical output of said first optical device to reduce a total polarization-dependent loss of said first and said second optical devices.

2. The system of claim 1, further comprising a measuring device for measuring a polarization dependent loss of an output of said second optical device.

3. The system of claim 1, wherein said first optical device is any one of a laser transmitter, a polarization beam splitter, an optical crystal, a waveguide, a circulator, and an interleaver.

4. The system of claim 1, wherein said second optical device is any one of a laser transmitter, a polarization beam splitter, an optical crystal, a waveguide, a circulator, an optical coupler, and an interleaver.

5. An apparatus for adjusting a polarization dependent loss, the apparatus comprising:
   a first optical device having an optical output;
   a second optical device optically coupled to said first optical device; and
   a polarization controller comprising at least one fiber optic cable loop, each of said at least one fiber optic cable loop being contained in a petal, said polarization controller being optically coupled to both said first optical device and said second optical device, said polarization controller adjusting a polarization state of said optical output of said first optical device to reduce a total polarization-dependent loss of said first and said second optical devices, said petals being rotatable about an axis that is parallel to a direction of travel of a light signal passing through said first and said second optical device to adjust said polarization dependent loss.

6. The apparatus of claim 5, further comprising a measuring device for measuring a polarization dependent loss of an output of said second optical device.

7. The apparatus of claim 5, wherein said first optical device is any one of a laser transmitter, a polarization beam splitter, an optical crystal, a waveguide, a circulator, and an interleaver.

8. The apparatus of claim 5, wherein said second optical device is any one of a laser transmitter, a polarization beam splitter, an optical crystal, a waveguide, a circulator, an optical coupler, and an interleaver.

* * * * *

UNITED STATES PATENT AND TRADEMARK OFFICE
CERTIFICATE OF CORRECTION

PATENT NO. : 7,206,466 B2  Page 1 of 1
APPLICATION NO. : 10/693774
DATED : April 17, 2007
INVENTOR(S) : He et al.

It is certified that error appears in the above-identified patent and that said Letters Patent is hereby corrected as shown below:

Column 4
Line 33, add --208-- after "loops"
Line 34, add --208-- after "loops"
Line 36, change "208" to --206--
Line 40, add --208-- after both instances of "loops"
Line 44, add --208-- after "loop"

Column 5
Line 10, add --208-- after "loops"
Line 20, add --208-- after "loops"
Line 25, add --208-- after "loops"
Line 28, add --208-- after "loops"
Line 40, add --208-- after "loops"

Signed and Sealed this

Twenty-third Day of March, 2010

David J. Kappos
*Director of the United States Patent and Trademark Office*